(12) United States Patent
Reichert et al.

(10) Patent No.: US 11,358,635 B2
(45) Date of Patent: Jun. 14, 2022

(54) REVERSE SWITCH ACTIVATION MECHANISM

(71) Applicant: DEERE & COMPANY, Moline, IL (US)

(72) Inventors: Christopher Reichert, West Bend, WI (US); James J Cinnamon, Mayville, WI (US)

(73) Assignee: DEERE & COMPANY, Moline, IL (US)

( * ) Notice: Subject to any disclaimer, the term of this patent is extended or adjusted under 35 U.S.C. 154(b) by 221 days.

(21) Appl. No.: 16/535,718

(22) Filed: Aug. 8, 2019

(65) Prior Publication Data

US 2021/0039711 A1 Feb. 11, 2021

(51) Int. Cl.
*B62D 11/00* (2006.01)
*B60W 30/18* (2012.01)

(52) U.S. Cl.
CPC ....... *B62D 11/003* (2013.01); *B60W 30/1819* (2013.01); *B60Y 2200/221* (2013.01); *B60Y 2200/223* (2013.01)

(58) Field of Classification Search
CPC ............. B62D 11/003; B60W 30/1819; B60Y 2200/223; B60Y 2200/221
See application file for complete search history.

(56) References Cited

U.S. PATENT DOCUMENTS

| | | | |
|---|---|---|---|
| 3,984,967 A | 10/1976 | Jones | |
| 3,999,643 A | 12/1976 | Jones | |
| 4,759,417 A * | 7/1988 | Wanie | B60K 20/00 180/273 |
| 4,883,137 A * | 11/1989 | Wanie | B60K 20/00 180/6.34 |
| 5,022,477 A | 6/1991 | Wanie | |
| 5,048,638 A * | 9/1991 | Duncan | B60W 30/18 180/307 |
| 5,314,038 A | 5/1994 | Peterson, Jr. | |
| 5,601,512 A | 2/1997 | Scag | |
| 5,842,378 A | 12/1998 | Zellmer | |
| 6,026,634 A | 2/2000 | Peter et al. | |
| 6,109,010 A | 8/2000 | Heal et al. | |
| 6,196,342 B1 * | 3/2001 | Teal | B62D 11/18 180/6.2 |
| 6,237,311 B1 | 5/2001 | Richards | |
| 6,237,711 B1 * | 5/2001 | Hunt | B60W 30/18 180/315 |
| 6,316,891 B1 | 11/2001 | Hough | |
| 6,405,513 B1 | 6/2002 | Hancock et al. | |
| 6,591,594 B2 | 7/2003 | Hancock et al. | |
| 7,017,326 B1 | 3/2006 | Keller et al. | |
| 7,104,036 B2 | 9/2006 | Trefz | |
| 7,224,088 B2 | 5/2007 | Shoemaker et al. | |

(Continued)

*Primary Examiner* — Scott A Reinbold

(57) ABSTRACT

A reverse switch activation mechanism includes forward and reverse pedals connected to a control arm for pivoting the control arm in first and second directions. A cam surface extends from the control arm and activates a reverse switch if the reverse pedal is partially depressed. A transmission control rod is connected to the control arm through a lost motion slot and moves rearwardly if the reverse pedal is depressed further after activating the reverse switch. A control rod keeper on the control arm biases the control rod pin to a first side of the lost motion slot.

11 Claims, 3 Drawing Sheets

(56) References Cited

U.S. PATENT DOCUMENTS 7,302,789 B2 12/2007 Eavenson, Sr. et al.
7,473,207 B1 1/2009 Hauser et al.
7,984,662 B1 7/2011 Hauser et al.

* cited by examiner

REVERSE SWITCH ACTIVATION MECHANISM

FIELD OF THE INVENTION

This invention relates to vehicles such as lawn and garden tractors or riding mowers with PTO driven attachments, and more specifically to a reverse switch activation mechanism to prevent or limit mowing in reverse.

BACKGROUND OF THE INVENTION

Vehicles such as lawn and garden tractors or riding mowers with PTO driven attachments may include an interlock circuit with several functions including the prevention or limitation of mowing in reverse. The interlock circuit may include a reverse sensing switch to turn off the PTO, which may be activated by depressing a reverse pedal. A transmission control rod also may connect the reverse pedal to a swash plate arm on a hydrostatic transmission. However, when the operator depresses the reverse pedal, the reverse switch may not detect the vehicle is in reverse until after it starts traveling in reverse. The reverse switch may not be activated at the same speed for all vehicles and/or operating conditions. For example, some vehicles or operation conditions may detect the vehicle is in reverse beginning at a speed of zero mph, and some may not detect the vehicle is in reverse and allow PTO operation until a speed of 0.68 mph.

A reverse switch activation mechanism is needed that may be activated to turn off the PTO before the transmission control rod moves in the reverse direction, and before the vehicle travels in reverse.

SUMMARY OF THE INVENTION

A reverse switch activation mechanism includes a control arm having a cam surface that pushes a plunger to activate a reverse switch in response to depressing a reverse pedal. A transmission control rod is connected to the control arm through a lost motion slot to prevent the transmission control rod moving rearwardly until the reverse pedal is depressed further after activating the reverse switch. The transmission control rod may be biased to a side of the lost motion slot.

DESCRIPTION OF THE PREFERRED EMBODIMENT

Figure 1:
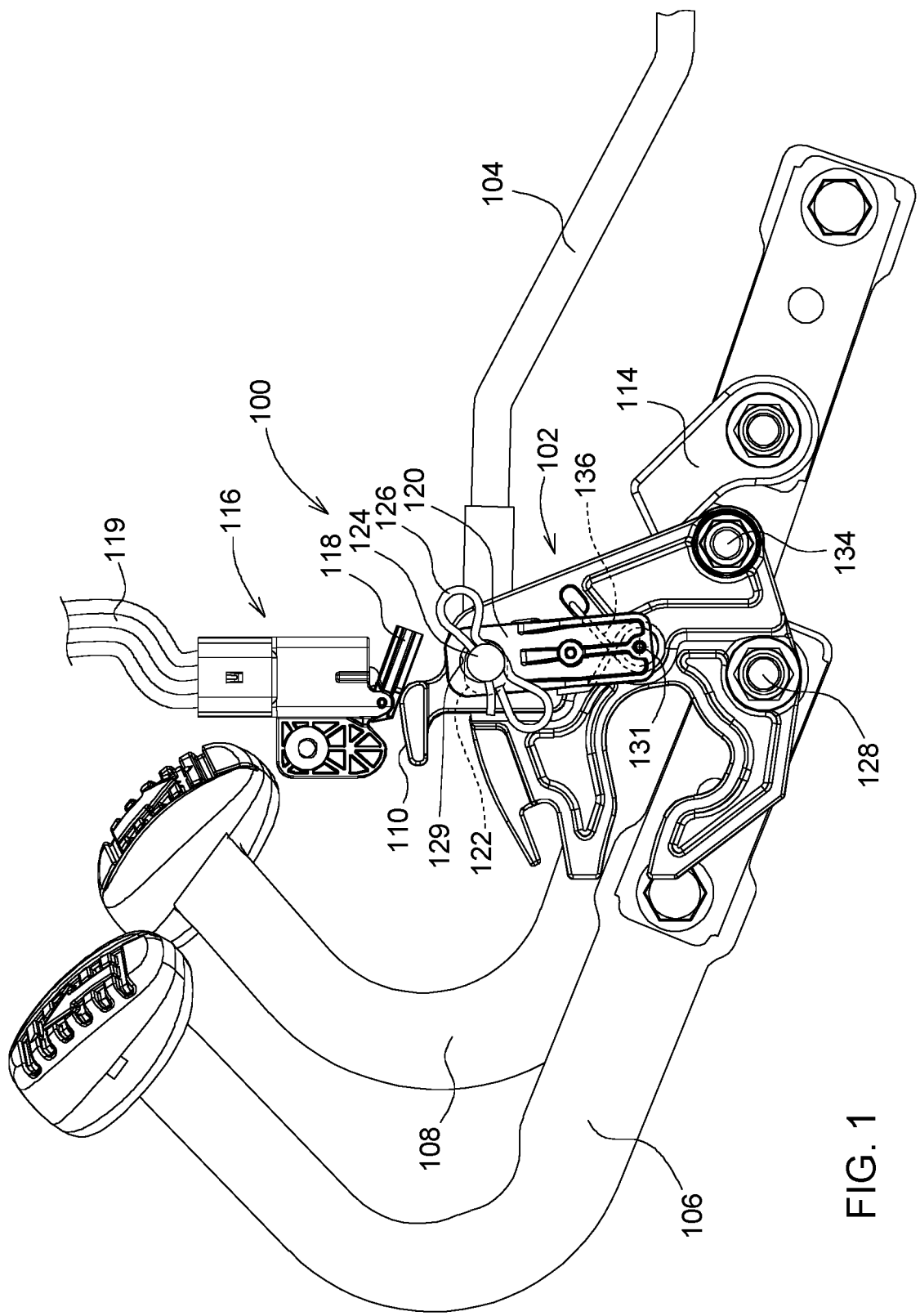
FIG. 1 is a side view of a reverse switch activation mechanism before the reverse pedal is depressed according to a preferred embodiment of the invention.
Figure 2:
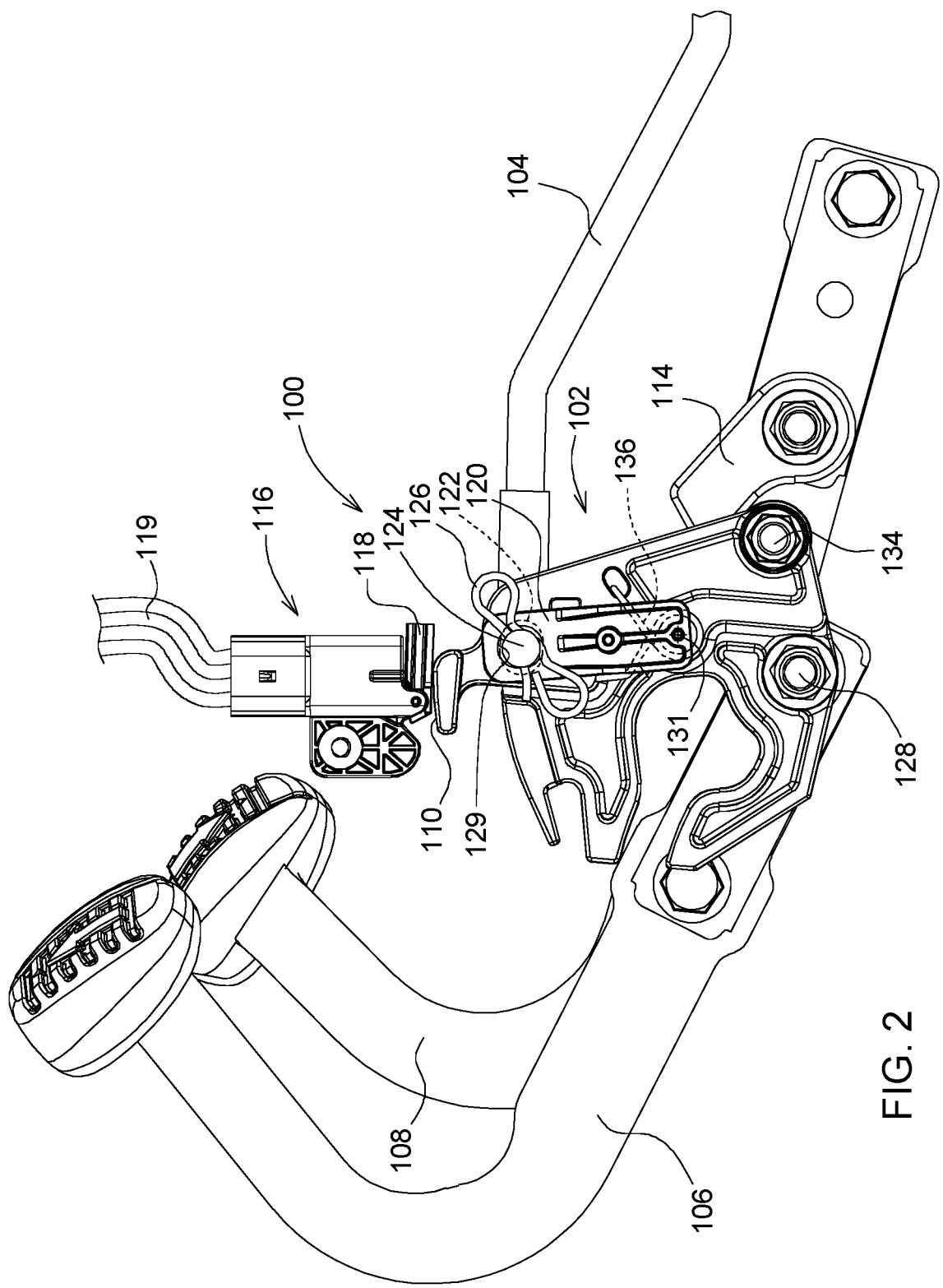
FIG. 2 is a side view of a reverse switch activation mechanism with the reverse pedal partially depressed and the transmission control rod has not moved in the reverse direction according to a preferred embodiment of the invention.
Figure 3:
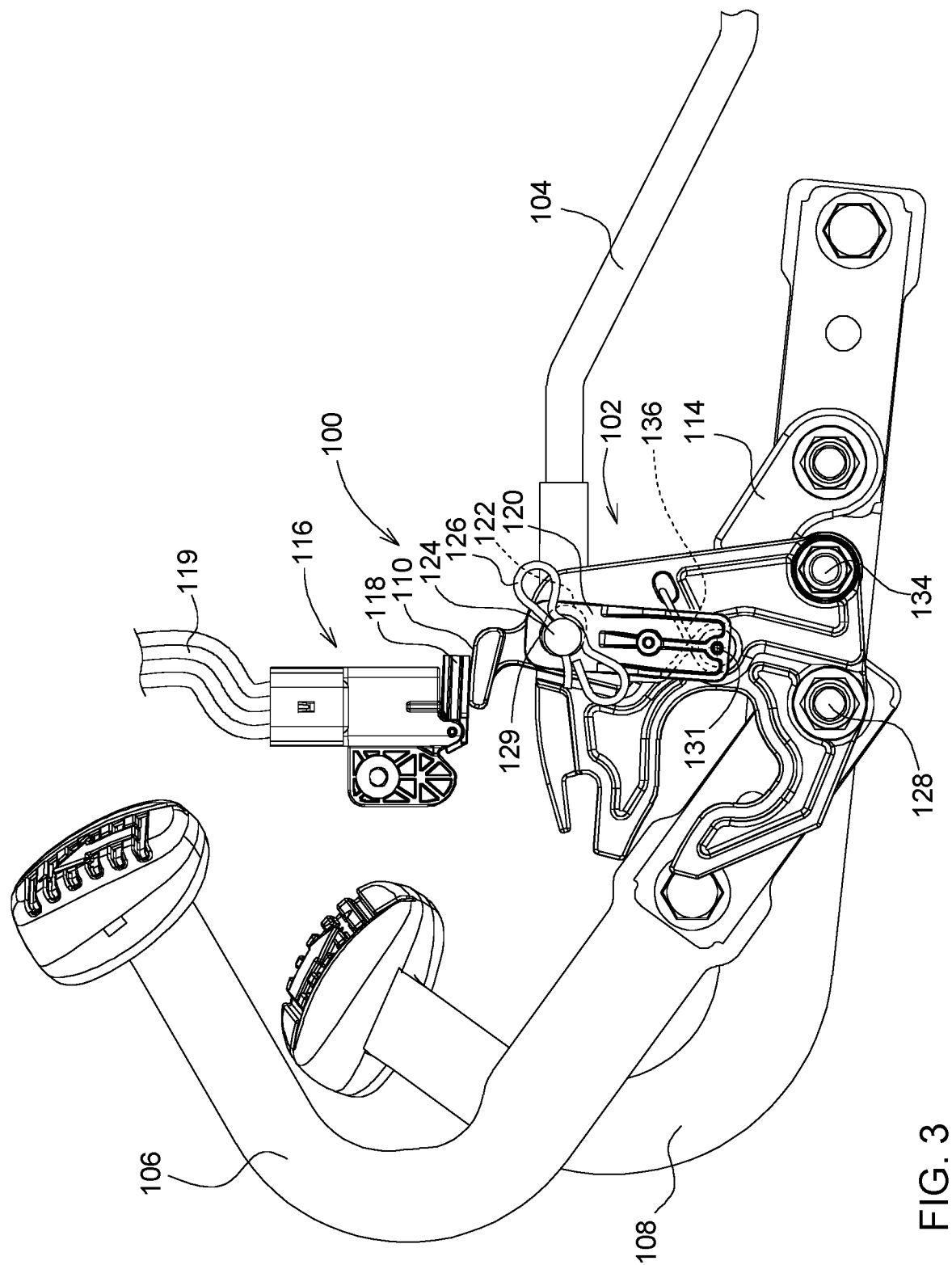
FIG. 3 is a side view of a reverse switch activation mechanism with the reverse pedal depressed further and the transmission control rod has moved in the reverse direction according to a preferred embodiment of the invention.

In a preferred embodiment of FIGS. 1-3, reverse switch activation mechanism 100 may be on a vehicle such as a lawn tractor or riding mower having a PTO driven attachment. Reverse switch 116 may be activated by depressing reverse pedal 108. The reverse switch may be part of an interlock circuit that is electrically connected by wiring harness 119 to a vehicle control unit (not shown) which may turn off the PTO and discontinue blade rotation when the reverse switch is activated. For example, the reverse switch may include plunger 118 that may pivot between a rest position about 10 degrees below horizontal, shown in FIG. 1, and an activated position where the plunger is generally horizontal, shown in FIGS. 2 and 3.

In a preferred embodiment, reverse switch activation mechanism 100 may include control arm 102 that pivots when the operator depresses forward pedal 106 or reverse pedal 108, and cam surface 110 extending upwardly from a top outer surface of the control arm. The operator may depress the forward pedal to pivot the control arm in a counter clockwise direction on forward pedal control shaft 128. The operator may depress the reverse pedal to pivot the control arm in a clockwise direction on pedal control shaft 128. When the reverse pedal is depressed, reverse pivot arm 114 on the reverse pedal may contact and push down on sleeve or bearing 134 located on control arm 102. When the control arm pivots in a clockwise direction, cam surface 110 may contact and move plunger 118 upwardly to activate the reverse switch. The reverse pedal may activate the reverse switch when the pedal is partially depressed (about 10% of maximum reverse pedal travel), and the reverse pedal may continue to activate the reverse switch when it is depressed further.

In a preferred embodiment, reverse switch activation mechanism 100 may provide a connection between transmission control rod 104, which extends rearwardly from control arm 102, to a swash plate on a hydrostatic transmission (not shown). Preferably, the transmission control rod may be connected with control rod pin 124 to the control arm. Control rod pin 124 may extend laterally from a forward end of transmission control rod 104, through lost motion slot 122 in the control arm, and also through hole 129 in control rod keeper 120, where it may be retained by clip 126. Preferably, the lost motion slot may have a side-to-side dimension at least about 1.5 times greater than the diameter of the control rod pin. Biasing spring 136 may urge control rod keeper 120 to pivot in a clockwise direction on pivot axis 131 on control arm 102. Thus, the control rod keeper may urge control rod pin 124 toward the right side of lost motion slot 122, to help prevent activation of the reverse switch in neutral when the operator steps off the reverse pedal.

In a preferred embodiment, as shown in FIG. 1, when the reverse pedal is not depressed, plunger 118 may extend downwardly to the rest position, and transmission control rod 104 may be in a neutral or forward position. Control rod pin 124 may be at the right side of lost motion slot 122. As shown in FIG. 2, when the operator partially depresses the reverse pedal, less than about 10% of the maximum reverse pedal travel, control arm 102 starts pivoting clockwise on axis 128, and cam surface 110 may push or pivot plunger 118 to the horizontal position to activate the reverse switch. However, the transmission control rod remains in the neutral position because control rod pin 124 is not contacted by the left side of lost motion slot 122. As shown in FIG. 3, when the operator depresses the reverse pedal further down, control arm 102 pivots further clockwise as the reverse switch remains activated. As a result, control rod pin 124 is contacted by the left side of the lost motion slot and is urged rearwardly, moving transmission control rod rearwardly so the vehicle travels in reverse.

In a preferred embodiment, reverse switch activation mechanism 100 assures the reverse switch is activated before the tractor travels in reverse, and before the tractor reaches a specified maximum speed in reverse such as 0.68 mph.

Having described the preferred embodiment, it will become apparent that various modifications can be made without departing from the scope of the invention as defined in the accompanying claims.

The invention claimed is:

1. A reverse switch activation mechanism, comprising: a control arm, a reverse switch, a plunger, and a reverse pedal;
   the control arm having a cam surface that pushes the plunger to pivot up from a downwardly extending position to activate the reverse switch in response to depressing the reverse pedal; and
   a transmission control rod connected to the control arm through a lost motion slot whereby the transmission control rod does not move rearwardly until the cam surface pivots the plunger to a horizontal position.

2. The reverse switch activation mechanism of claim 1 whereby the control arm pivots in a first direction in response to depressing the reverse pedal and in a second direction in response to depressing a forward pedal.

3. The reverse switch activation mechanism of claim 1 wherein the transmission control rod is biased to a side of the lost motion slot.

4. A reverse switch activation mechanism, comprising:
   a forward pedal connected to a control arm for pivoting the control arm in a first direction and a reverse pedal connected to the control arm for pivoting the control arm in a second direction;
   a cam surface extending from the control arm that activates a reverse switch if the reverse pedal is partially depressed by moving the reverse switch up from a downwardly extending position; and
   a transmission control rod connected to the control arm and moving rearwardly if the reverse pedal is depressed further so that the cam surface moves after activating the reverse switch to a horizontal position.

5. The reverse switch activation mechanism of claim 4 further comprising a lost motion slot connecting the transmission control rod to the control arm.

6. The reverse switch activation mechanism of claim 5 further comprising a control rod pin on the transmission control rod and through the lost motion slot.

7. The reverse switch activation mechanism of claim 6 further comprising a control rod keeper on the control arm biasing the control rod pin to a first side of the lost motion slot.

8. A reverse switch activation mechanism, comprising: a control arm, a plunger switch, a reverse pedal, and a transmission control rod;
   the control arm having a cam surface that contacts and starts pivoting the plunger switch switch turning off a power take off when the reverse pedal is partially depressed and moves the transmission control rod rearwardly to begin rearward travel if the reverse pedal is depressed further and the cam surface continues pivoting the plunger switch to a horizontal position.

9. The reverse switch activation mechanism of claim 8 wherein the control arm pivots in response to depressing the reverse pedal.

10. The reverse switch activation mechanism of claim 8 wherein the transmission control rod is connected to the control arm through a lost motion slot.

11. The reverse switch activation mechanism of claim 10 wherein the transmission control rod is biased to a first side of the lost motion slot.

* * * * *